July 4, 1967

C. L. LONGERT 3,329,184

APPARATUS FOR THE SIMULTANEOUS DEBRANCHING AND DEBARKING OF FELLED TREES AND THE LIKE

Filed Nov. 25, 1964

INVENTOR
CHRISTIAN LEO LONGERT

BY Werner W. Kleeman

ATTORNEYS

INVENTOR
CHRISTIAN LEO LONGERT
BY
ATTORNEYS

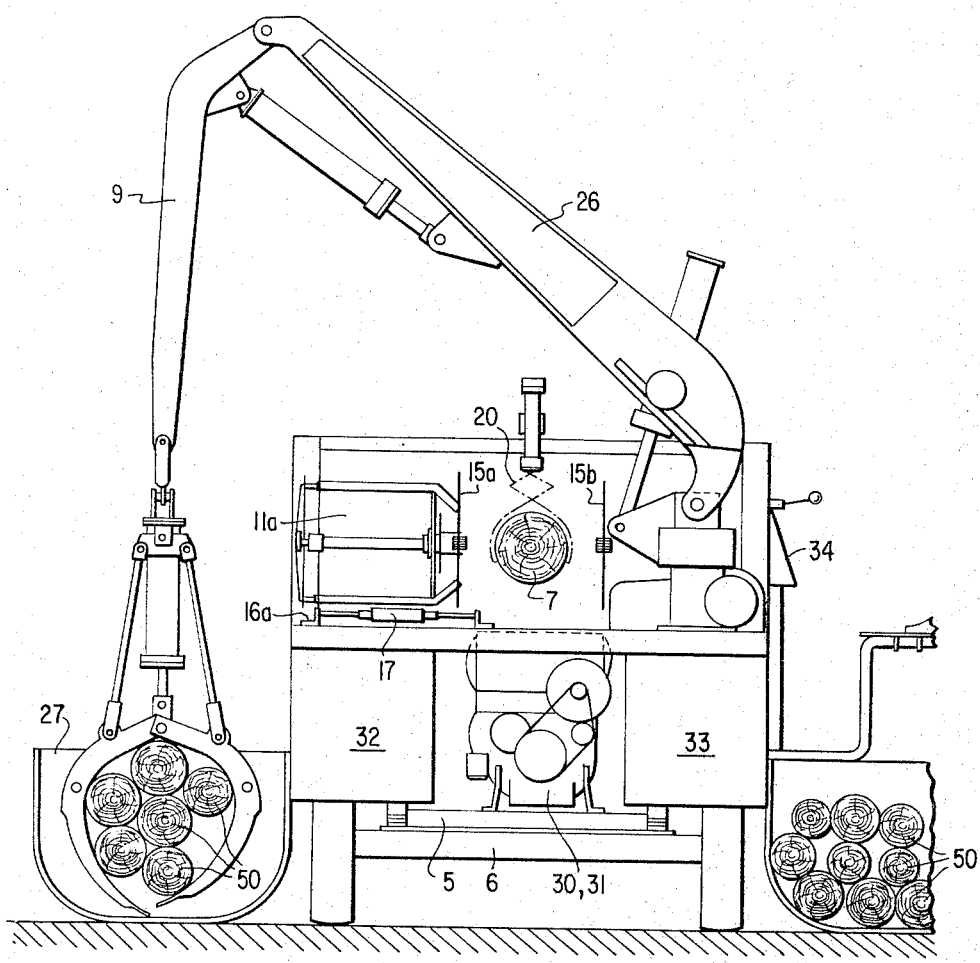

3,329,184
APPARATUS FOR THE SIMULTANEOUS DEBRANCHING AND DEBARKING OF FELLED TREES AND THE LIKE
Christian Leo Longert, Pfarrgasse 3,
Vaduz, Liechtenstein
Filed Nov. 25, 1964, Ser. No. 413,746
Claims priority, application Switzerland, Dec. 2, 1963,
14,707/63
9 Claims. (Cl. 144—3)

The present invention has reference to an improved apparatus for the simultaneous debranching and debarking of felled trees.

Apparatus are already known to the art which permit processing of felled trees in a mechanical manner. However, with such apparatus it is generally only possible to carry out a single debarking, whereas debranching must be previously manually performed. On the other hand, in my United States Patent 3,030,986, granted Apr. 24, 1962, and entitled "Process and Device for the Mechanical Working of Unfelled Trees," there is described and claimed a climbing apparatus which permits simultaneous debranching and debarking of unfelled trees in mechanical manner. Such an apparatus is also set forth in my Swiss Patent 359,924.

Now, the present invention has for one of its primary objects to provide an improved apparatus which renders possible the simultaneous debranching and debarking of felled trees.

Another important object of this invention is directed towards the provision of improved apparatus for the mechanical working of felled trees which is highly reliable in operation, relatively simple to operate, and enables the debranching and debarking of felled trees to be carried out in an extremely efficient manner.

In order to implement the aforementioned objects, as well as other objects which will become apparent as the description proceeds, the apparatus of the subject invention is manifested by the features that, there is provided a climbing device of the type disclosed in my aforementioned United States Patent 3,030,986 or my Swiss Patent 359,924 which is arranged upon horizontal guide elements for the tree being processed, and the climbing elements of such climbing device cooperate with the tree trunk in order to generate a feed movement of such tree trunk upon the aforesaid guide elements.

Other features, objects and advantages of the invention will become apparent by reference to the following detailed description and drawings in which:

FIGURE 3 is an end view of the apparatus depicted in FIGURE 1.

Figure 1:
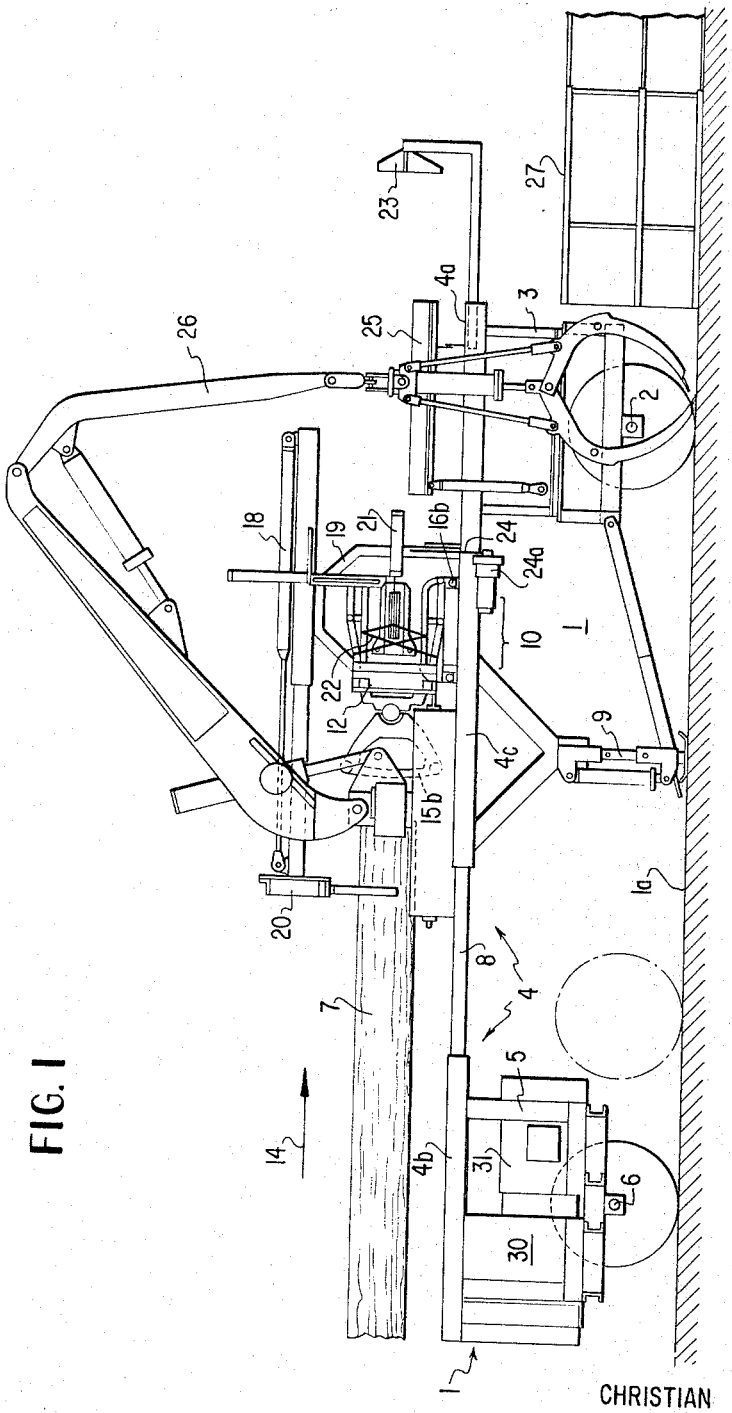
FIGURE 1 is a side view of the inventive apparatus for the simultaneous debranching and debarking of felled trees.

Describing now the drawings, it should be appreciated that the inventive apparatus for the simultaneous debranching and debarking of felled trees incorporates a transportable or mobile undercarriage 1. This undercarriage or supporting structure 1 is provided with a first wheel shaft 2 carrying a horizontally extending work table portion or surface element 4a through the agency of a frame 3. A further work table portion or surface element 4b, which in the illustrated operable position of the apparatus is spaced from the first work table portion or surface element 4a, bears via a frame 5 upon a second wheel shaft 6. Both of the work table portions 4a and 4b provide guide means which collectively build a support in the form of a work table 4 for the tree 7 to be processed.

It will further be seen that both work table portions or surface elements 4a and 4b are operably interconnected through the agency of rod means 8 capable of being hydraulically actuated and which permit shortening the spacing between the shafts 2 and 6 of the undercarriage 1 when the apparatus is to be transported to a different location. In order to increase the stability of the work table 4 during operation of the inventive apparatus there is provided a hydraulically actuated support device 9 (FIGURE 1) which engages beneath the jutting-out portion 4c of the work table 4 disposed between the wheel shafts 2 and 6 and provides its support at the floor or ground 2a.

Now, in order to debranch and debark the tree trunk or tree 7 guided upon the work table 4 there is provided a known climbing device 10. It is again mentioned that such a climbing device 10 is disclosed in my previously mentioned United States Patent 3,030,986 and Swiss Patent 359,934, as well as also in my Austrian Patent 217,768. Since the details of the physical structure of such climbing device are not essential to obtain an understanding of the underlying principles of the present invention, only enough of such structure will be given as is considered necessary to facilitate the comprehensibility of the inventive subject matter.

Figure 2:
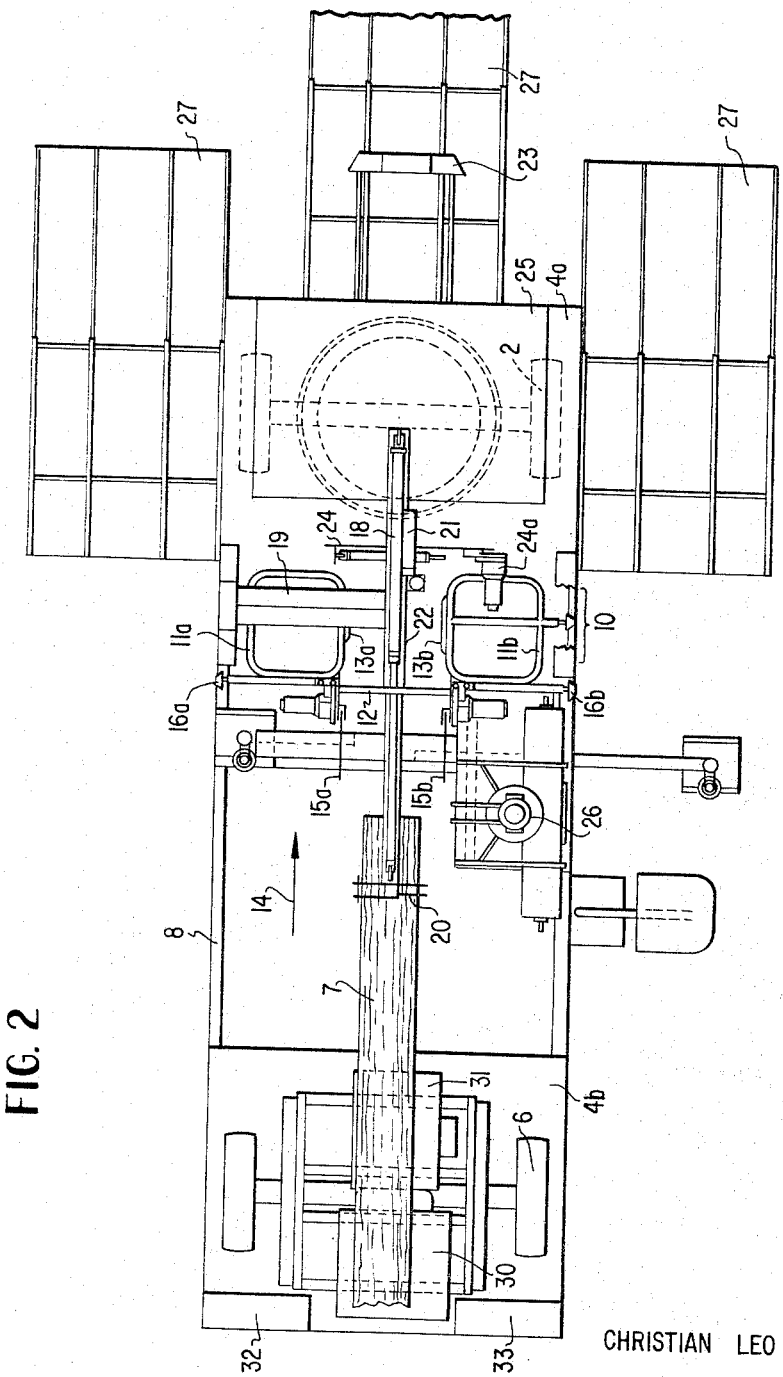
FIGURE 2 is a top plan view of the apparatus depicted in FIGURE 1.

Thus, generally speaking, such a climbing device 10 comprises two similarly constructed climbing mechanisms 11a and 11b which are merely schematically depicted in FIGURE 2. These climbing mechanisms 11a and 11b are arranged in diametrically opposed relation upon the work table portion 4a with respect to the tree trunk 7. At least one cutting chain means 12 is guided and driven from both of these climbing mechanisms 11a and 11b. This cutting chain 12 encircles about the tree trunk 7 and revolves therearound in order to process such tree trunk by debranching and debarking.

Additionally, each of these climbing mechanisms 11a and 11b exhibits climbing elements, for instance in the form of caterpillar tracks 13a and 13b, respectively, which roll upon the introduced tree trunk 7 and impart to the latter a feed or advancing movement in the direction of the arrow 14. As a result, the tree trunk 7 is debranched and debarked by means of the cutting chain 12, in the manner as described in detail in the aforementioned patents. In order to prepare a path of travel for both climbing mechanisms 13a and 13b in front of the path of the cutting chain 12 at the tree trunk 7, a respective auxiliary cutting device 15a and 15b is connected in front of each climbing mechanism 11a and 11b, respectively. Such auxiliary cutting devices 15a and 15b, as fully explained in my aforementioned United States patent, cut-off the branches and projections growing at the tree trunk 7 in the region of the climbing mechanisms 13a and 13b during operation of the entire climbing device 10, so that there is smoothed-out a path of travel for the aforesaid climbing device along and in a direction towards the top of the tree trunk 7.

By inspecting FIGURES 2 and 3 it can be seen that the climbing mechanisms 11a and 11b are arranged upon the work table portion 4a by means of support elements, for example in the form of support frames 16a and 16b respectively. Moreover, such climbing mechanisms 11a and 11b can be guided upon supporting guide rails 17 for example (FIGURE 3), enabling each climbing mechanism 11a and 11b to be applied to the tree trunk 7. Such means for applying both of the climbing mechanisms 11a and 11b to the tree trunk 7 can cooperate directly with the tensioning mechanisms for the cutting chain, as described in my aforementioned United States patent, and for such reason not further explained herein. It is only further mentioned, by way of example, that simultaneous with the introduction of pressurized medium for the actuation of the tensioning mechanisms for the cutting chain means 12 both of the climbing mechanisms 11a and 11b could also be pressed against the tree trunk 7 by hydraulic or pneumatic means.

Now, in order to begin operation, the felled tree or tree trunk 7 is initially deposited upon the work table portion 4b with its stump directed towards the climbing device 10. In order to enable the tree to be supported and guided in a troublefree manner this work table portion 4b can be lengthened in the direction of the tree top by further tables (not shown) which can be applied to the aforesaid work table portion 4b and are supported by the ground 1a. Thereafter, a hydraulically actuated gripper 18, movably mounted via a frame 19 upon the work table portion 4a in the axial direction of the tree trunk 7, is placed into operation. Consequently, the tongs or clamps 20 of this gripper 18 engage the tree trunk 7 and pull the latter to such an extent between both climbing mechanisms 11a and 11b of the climbing device 10 that the caterpillar tracks 13a and 13b respectively, after laterally advancing both aforesaid climbing mechanisms 11a and 11b, engage at the tree trunk 7. During this operating phase of the apparatus, the cutting chain 12 is also tensioned, so that when the tongs 20 are released the tree trunk 7 passes through the climbing device 10 owing to the climbing movement of the caterpillar tracks 13a and 13b, such tree trunk thus being debranched and debarked. In order to be able to properly introduce the tree trunk 7 in the loop of the cutting chain 12 at the beginning of the operating procedure, there is provided an expandable clamp means 22 which can be actuated hydraulically by means of a lifting or operating cylinder 21. This expandable clamp means or unit 22 permits the cutting chain 12 to be sufficiently opened prior to introducing the tree trunk 7 so that the latter can be pushed into the loop of such cutting chain without contact therewith.

During a further operating phase of the apparatus the processed tree trunk 7 leaving the climbing device 10 arrives at stop means 23 which are adjustably connected to the work table portion 4a. By means of this stop means 23 it is possible to determine the length of the section or piece 50 which is to be cut from the processed tree trunk, the cutting operation of which takes place by means of a cutting saw 24 arranged at the work table portion 4a. The finite cut-off wood pieces or sections 50 come to bear upon a horizontal platform 25 which, depending upon the thickness of the tree trunk, can be adjusted as to elevation and inclination with respect to the work table 4. Such wood pieces then roll from this location, in dependence upon the inclined position, into collecting containers or receptacles 27. Emptying of the collecting containers 27 is undertaken by means of hydraulically actuated loader means 26 which are rotatably mounted upon the work table portion 4a. The loader means 26 then places the cut wood sections or pieces 50 upon non-illustrated vehicles suitable for transporting them away.

In order to operate the electrically drivable climbing mechanisms 11a and 11b of the climbing device 10, a motor 30 and generator 31 are arranged upon the frame 5 which simultaneously serve to drive the drive motor 24a of the cutting saw 24 and to drive the pump of the common non-illustrated hydraulic system of the aforedescribed hydraulically actuated devices.

A control device 32 which through the agency of a regulating device 33 influences the individual working operations of the apparatus serves to provide a synchronous control of the different components of the apparatus which are to cooperate with one another as previously described. Both of these devices 32 and 33 are likewise supported by the frame 5 of the undercarriage 1 of the described apparatus and are connected in suitable manner between motor and hydraulic actuation mechanisms, such as motors and pumps respectively. The operation of the apparatus can advantageously take place from a control panel 34 coupled with the control device 32, as best shown in FIGURE 3, such control panel 34 being arranged at the undercarriage 1.

The economic advantages of the described apparatus should be readily apparent since such apparatus permits the debranching and debarking in mechanical manner of felled trees in lying position by means of the described climbing device 10, whereby processing of the trees in such horizontal position additionally permits a simultaneous cutting-up of the debranched and debarked tree trunk.

While there is shown and described a present preferred embodiment of the invention it is to be distinctly understood that the invention is not limited thereto but may be otherwise variously embodied and practised within the scope of the following claims.

What is claimed is:

1. Apparatus for the simultaneous debranching and debarking of felled trees comprising substantially horizontally arranged guide means for a felled tree, a climbing device disposed upon said guide means, said climbing device including means for the simultaneous debranching and debarking of a felled tree, said climbing device further incorporating climbing elements cooperating with the trunk of the felled tree in order to generate a feed movement of such tree trunk upon said guide means.

2. Apparatus for the simultaneous debranching and debarking of felled trees as defined in claim 1, wherein said guide means includes a transportable work table, support means arranged upon said work table for carrying said climbing device.

3. Apparatus for the simultaneous debranching and debarking of felled trees as defined in claim 2, wherein said support means includes a number of support elements, said climbing device further including at least two climbing mechanisms, a given one of said climbing mechanisms being carried by a respective support element, means cooperating with said support elements for advancing the associated climbing mechanism towards the trunk of the tree.

4. Apparatus for the simultaneous debranching and debarking of felled trees as defined in claim 2, said debranching and debarking means including at least one loop-like cutting chain means, and means for opening said cutting chain means to permit insertion of the trunk of the tree.

5. Apparatus for the simultaneous debranching and debarking of felled trees as defined in claim 4, including gripper means for moving the tree trunk directly into said cutting chain means after opening of the latter.

6. Apparatus for the simultaneous debranching and debarking of felled trees as defined in claim 2, further including means for cutting the trunk of the tree into individual sections after debranching and debarking of said tree trunk.

7. Apparatus for the simultaneous debranching and debarking of felled trees as defined in claim 6, further including adjustable stop means for determining the length of the tree trunk section to be cut.

8. Apparatus for the simultaneous debranching and debarking of felled trees as defined in claim 7, including collector means positioned to receive the cut individual sections of the tree trunk.

9. Apparatus for the simultaneous debranching and debarking of felled trees as defined in claim 8, wherein loader means are provided for removing the cut individual sections of the tree trunk from said collector means.

References Cited

UNITED STATES PATENTS

| | | | |
|---|---|---|---|
| 2,760,534 | 8/1956 | Hansel | 144—208.9 |
| 2,876,816 | 3/1959 | Busch et al. | 144—3 |
| 2,882,941 | 4/1959 | Pope | 144—3 |
| 3,029,848 | 4/1962 | Bombardier | 144—2 |
| 3,223,129 | 12/1965 | Nicholson | 144—1 |

FOREIGN PATENTS

| | | |
|---|---|---|
| 621,584 | 6/1961 | Canada. |
| 874,445 | 8/1961 | Great Britain. |

ANDREW R. JUHASZ, *Primary Examiner.*

WILLIAM W. DYER, Jr., W. D. BRAY,
*Assistant Examiners.*